United States Patent Office 3,523,978
Patented Aug. 11, 1970

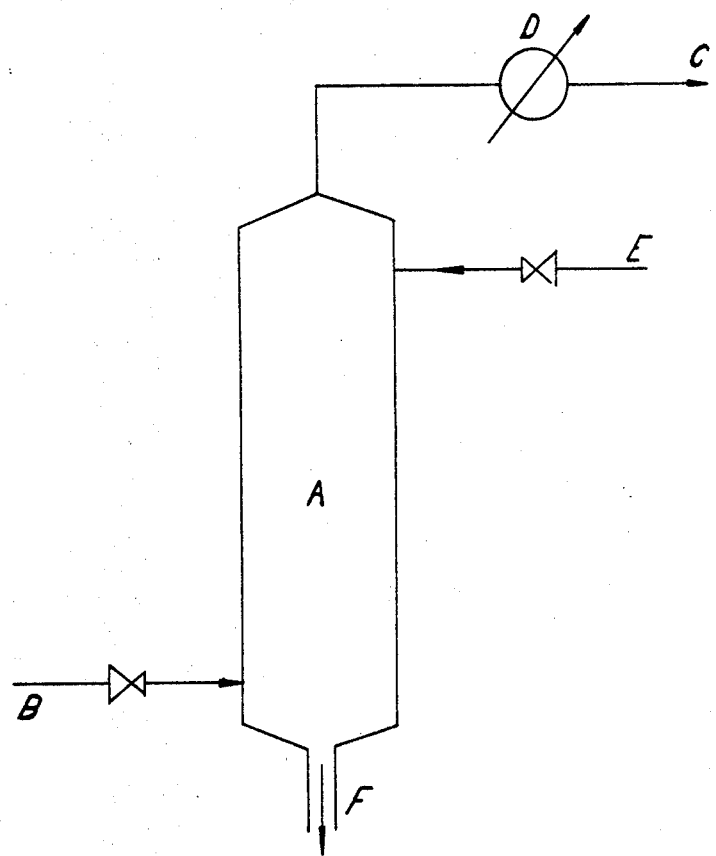

3,523,978
PROCESS FOR THE PURIFICATION
OF BENZYL ALCOHOL
Jacques Bonnart and Paul Rey, Lyon (Rhone), France, assignors to Rhone-Poulenc S.A., Paris, France, a French body corporate
Filed Jan. 9, 1968, Ser. No. 696,617
Claims priority, application France, Jan. 19, 1967, 91,790
Int. Cl. C07c 29/24
U.S. Cl. 260—618    3 Claims

ABSTRACT OF THE DISCLOSURE

Cresols are removed from benzyl alcohol containing the same by contacting the benzyl alcohol in vapour form with a solution of an alkali metal benzylate.

This invention relates to the purification of benzyl alcohol.

Benzyl alcohol obtained by oxidation of toluene in the liquid phase or by hydrogenation of benzaldehyde produced by the oxidation of toluene in the gas phase always contains an appreciable quantity of cresols. The presence of these cresols, even in a quantity as small as for example, 0.01% represents an obstacle to certain industrial applications of benzyl alcohol, notably in the perfume industry, because they modify the odour of the essences, and in dyestuffs because they cause the formation of coloured contaminants.

The present invention provides a process for the purification of benzyl alcohol by means of which substantially all the cresol impurities can be eliminated. The new process comprises passing crude benzyl alcohol in vapour form in intimate countercurrent contact with a solution of an alkali metal benzylate, and condensing the benzyl alcohol vapour obtained. In this process, the cresol-contaminated benzyl alcohol is passed as vapour to the base of plate column or a packed column, in which it passes in countercurrent through a solution of alkali metal benzylate, this benzylate being formed in advance or in situ.

In this way, the cresols present in the benzyl alcohol vapours pass into the liquid phase as alkali metal cresolates, thus regenerating the benzyl alcohol introduced as benzylate.

The reaction may be diagrammatically represented as follows:

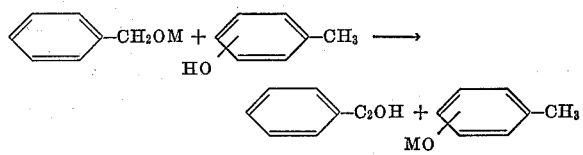

in which formula M represents an alkali metal, preferably sodium or potassium.

By this process, the cresols may be eliminated substantially completely and it is thus possible to obtain benzyl alcohol which gives no indication for cresols in the photocolorimetric test with aminoantipyrine, which detects as little as 0.0005% cresols. The product may in consequence be employed in the most exacting industrial sectors.

The new process also lends itself to the treatment of impure benzyl alcohol whose cresol content is fairly high, for example 5% to 10% by weight, without losing its efficacity. However, it is most advantageous when the benzyl alcohol has a cresol content of 0.005% to 1%.

As the foregoing reaction equation shows, it is theoretically sufficient to employ 1 molecule of alkali metal benzylate per molecule of cresol, but in practice it is preferable to operate in the presence of an excess of benzylate which may, though this is not essential, be up to 15 times the theoretical quantity of benzylate necessary for the reaction.

The alkali metal benzylate may be either prepared in advance or formed in situ, i.e. in the reaction medium, using a compound which reacts under the operating conditions with benzyl alcohol to form an alkali metal benzylate. When it is desired to operate with preformed benzylate, the latter may be prepared by adding the corresponding alkali metal base to benzyl alcohol and heating the mixture to eliminate the water as it is formed. In this case, the concentration of the benzylate solution employed is not critical, and it is merely limited by the solubility of the benzylate at the temperature at which the purification is carried out.

When it is desired to form the alkali metal benzylate in the reaction medium, it is possible, for example, to bring the vapours of the benzyl alcohol to be purified into contact with a solution in the chosen solvent of the compound which forms the benzylate, such as an alkali metal base or an alkali metal alcoholate of a lower alkanol such as sodium ethoxide. Generally, it is preferred to employ a solution of an alkali metal base such as a sodium hydroxide solution. In this case, a sodium hydroxide concentration of the order of 2% by weight in the solvent employed is generally suitable.

The alkali metal benzylate or compound which produces the same may be in solution in any solvent which does not cause parasitic reactions with the benzyl alcohol under the conditions of the experiment. In this respect, it is especially convenient to use benzyl alcohol as solvent.

When a solvent other than benzyl alcohol is employed, it is preferable for it to have a distinctly higher boiling point than the latter in order to avoid excessive entrainment of the solvent by the benzyl alcohol vapours, which entrainment would make it necessary to effect a subsequent rectification.

The benzyl alcohol vapours may be at various temperatures, depending upon whether the operation is carried out under atmospheric pressure or under reduced pressure. However, it is not advantageous to carry out the process at too low a temperature, because it is then necessary to produce a high vacuum in order to vaporise the benzyl alcohol. On the other hand, the use of high temperatures, of the order of 220°–230° C., favours the formation of undesirable by-products. In practice, a temperature between 100° C. and 200° C. is generally suitable, and this involves operating at an absolute pressure from 20 to 760 mm. Hg.

The solution of alkali metal benzylate, or compound which produces the same, in the chosen solvent may be injected into the benzyl alcohol vapours to be purified, at the temperature of these vapours or at lower temperature. When this solution is at a lower temperature it is preferable to apply heat from the outside to the reaction medium, so as to avoid an excessive condensation of benzyl alcohol.

In practice, the purification is best carried out in an apparatus which promotes excellent gas-liquid contact, such as a plate-type or packed column. The best results are generally obtained when a plate-type column is employed.

The benzyl alcohol to be purified may be continuously injected in vapour form into the base of the column, while a solution of alkali metal benzylate, alkali metal base or other compound which produces alkali metal benzylate, in the chosen solvent is supplied to the top of the latter, also continuously.

The temperature and the pressure in the column are maintained at values such that the benzyl alcohol remains in vapour form.

At the top of the column benzyl alcohol substantially free from cresols is collected, while a liquid containing the solvent, the excess benzylate and alkali metal cresolates is extracted from the base.

The single figure of the accompanying drawing shows diagrammatically a preferred apparatus for the industrial application of the new process. In the drawing, A is a plate-type or packed distilation column; B is the point of admission of the benzyl alcohol to be purified; C is the outlet for the purified benzyl alcohol; D is a condenser; E is the point of admission of the solution of the alkali metal benzylate or compound which produces the same; F is the point of outlet for the mixture of excess of alkali metal benzylate, alkali metal cresolates and solvent.

The following examples illustrate the invention.

EXAMPLE 1

The apparatus employed is a column 160 mm. in diameter comprising 9 plates with 2 bubble caps, each plate having a capacity of 250 cc.

The benzyl alcohol to be purified, which contains 0.6% of cresols, is fed to the base of the column at a rate of 6.1 kg. per hour as vapour at 110–115° C., the absolute pressure at the top of the column being 30 mm. Hg. A 30% by weight solution of sodium benzylate in benzyl alcohol at 100° C. is injected at the uppermost plate of the column at a rate of 0.4 kg. per hour. Benzyl alcohol vapours are collected at the top of the column which, after condensation, contain less than 0.0005% of cresols (determined by photocolorimetry with aminoantipyrine).

EXAMPLE 2

The operation is carried out in a column 500 mm. in diameter, equipped with 8 plates each having a central bubble cap. The upper part of the column is heated by steam under pressure at 135–140° C.

The benzyl alcohol to be purified, which contains 0.05% of cresols, is admitted at the base of the column at a rate of 150 kg. per hour as vapour at 145° C. under an absolute pressure of 85 mm. Hg. The temperature at the top of the column is 122° C. and the absolute pressure is 50 mm. Hg. A 2% by weight solution of sodium hydroxide in benzyl alcohol at 25° C. is admitted at the top plate of the column at a rate of 15 kg. per hour. 150 kg. per hour of benzyl alcohol containing less than 0.0005% of cresols are collected at the top of the column.

We claim:

1. Process for removing cresols from benzyl alcohol, which comprises passing crude benzyl alcohol in vapour form in intimate countercurrent contact with a solution of an alkali metal benzylate, and condensing the benzyl alcohol vapour obtained.

2. Process according to claim 1 in which the contact takes place in a plate-type or packed column.

3. Process according to claim 1, wherein the alkali metal benzylate is dissolved in benzyl alcohol.

References Cited

UNITED STATES PATENTS

| | | | |
|---|---|---|---|
| 2,199,585 | 5/1940 | Bone et al. | 260—599 |
| 2,635,120 | 4/1953 | Alm | 260—621 |
| 3,031,383 | 4/1962 | Millikan | 260—627 |
| 3,387,036 | 6/1968 | Bonnart et al. | 260—618 |
| 3,437,696 | 4/1969 | Achard et al. | 260—618 |

BERNARD HELFIN, Primary Examiner

U.S. Cl. X.R.

260—621